June 12, 1956 — G. GUIGAS — 2,749,855
PLANTING DEVICE
Filed Nov. 25, 1952 — 5 Sheets-Sheet 1

Inventor:
Gustav Guigas,
by R. W. Furlong
Attorney

June 12, 1956 G. GUIGAS 2,749,855
PLANTING DEVICE
Filed Nov. 25, 1952 5 Sheets-Sheet 2

Inventor:
Gustav Guigas,
by R.W. Furlong
Attorney

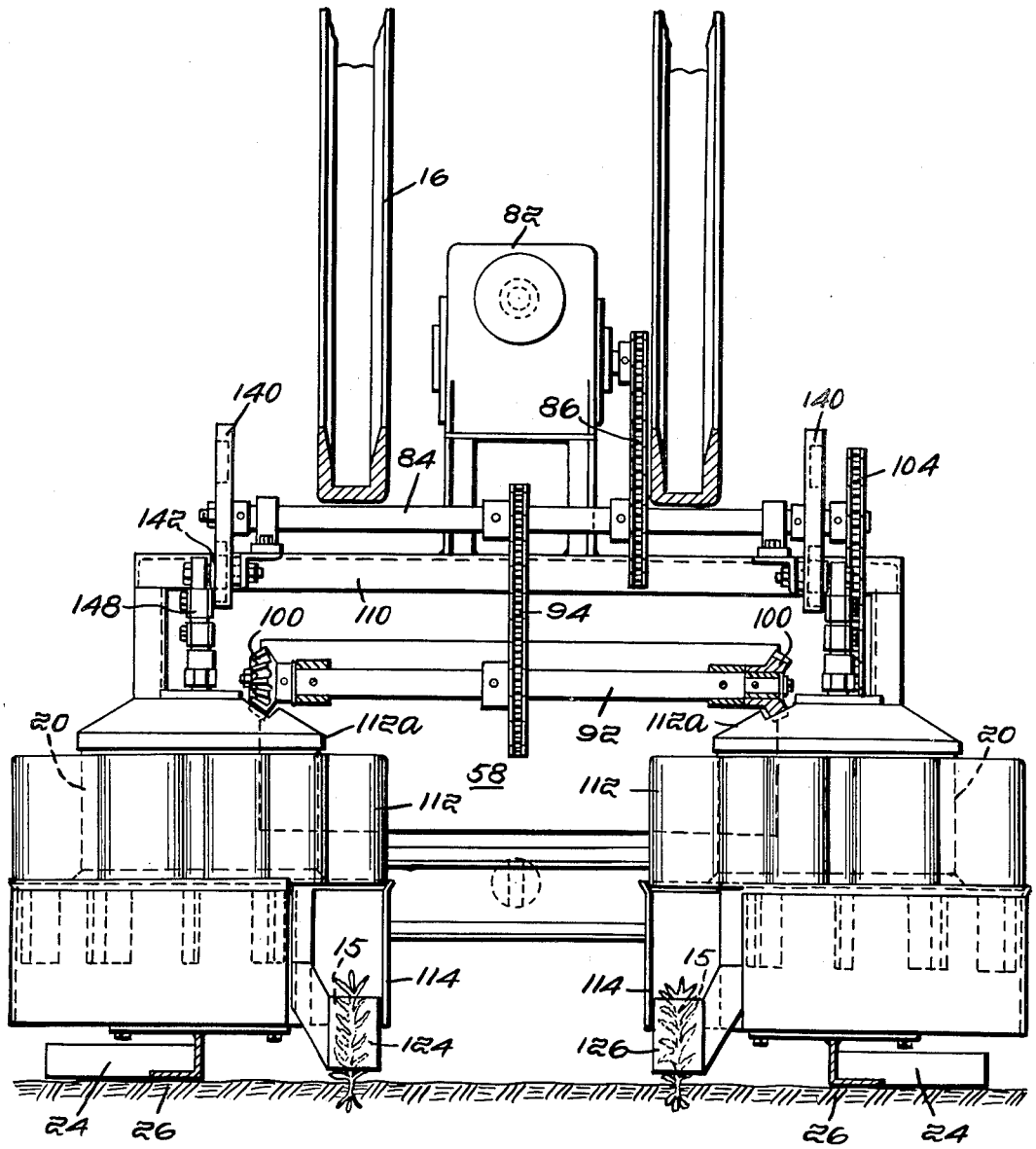

June 12, 1956  G. GUIGAS  2,749,855
PLANTING DEVICE
Filed Nov. 25, 1952  5 Sheets-Sheet 4
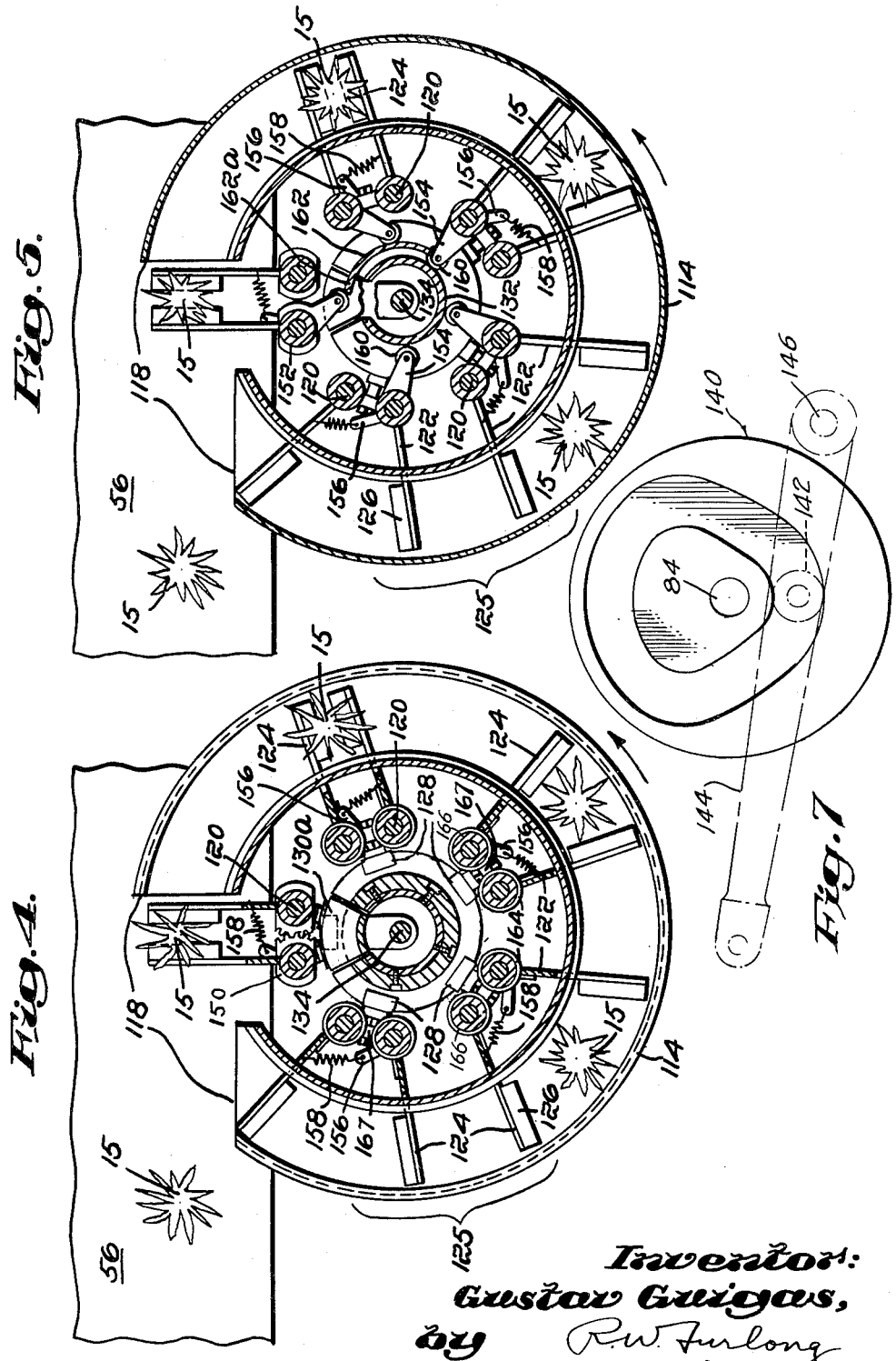
Inventor:
Gustav Guigas,
by R.W. Furlong
Attorney

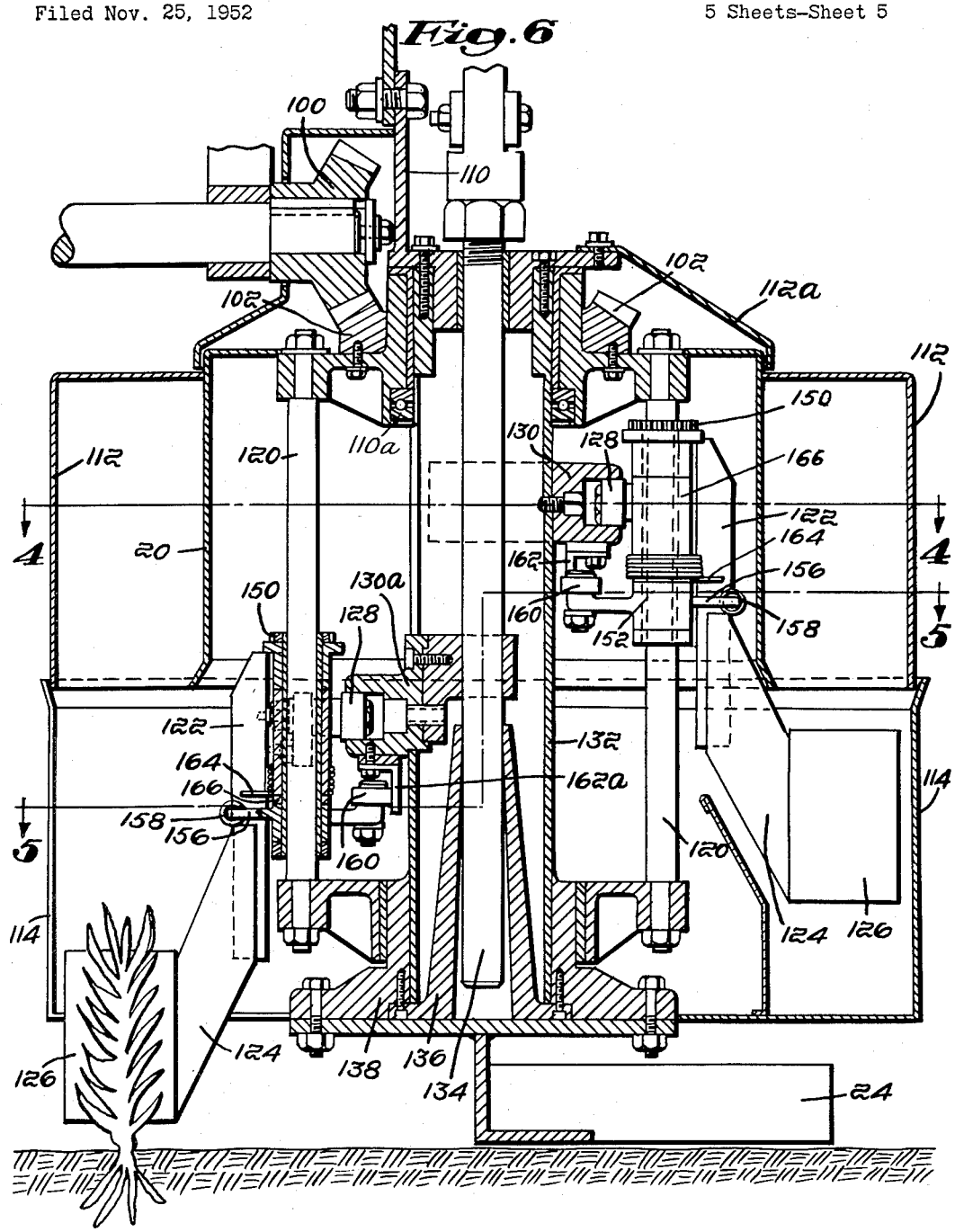

United States Patent Office 2,749,855
Patented June 12, 1956

2,749,855

PLANTING DEVICE

Gustav Guigas, Honolulu, Territory of Hawaii, assignor to Hawaiian Pineapple Company, Limited, Honolulu, Territory of Hawaii, a corporation of the Territory of Hawaii Application November 25, 1952, Serial No. 322,437

4 Claims. (Cl. 111—3)

My invention concerns a further improvement in the planting aid described in the co-pending application of Minoru Nakai, Serial No. 263,745, filed December 28, 1951, now Patent No. 2,708,812.

This device was developed for use especially in planting operations wherein it is necessary or desirable to cover the soil in which the plants are deposited with paper or a functionally equivalent material, serving to retard evaporation of moisture from the soil. The device is considered particularly valuable as applied in the planting of pineapple plants, and the improvement herein will be specifically described with relation to the device as so applied. By the term pineapple "plants" I mean to embrace not only the normally used "slips" and "suckers" but also "crowns," which are often employed in areas or during seasons when there is a shortage of slips and suckers.

In the device of the above-identified patent, the plants are inserted manually into the soil, and it is desirable to eliminate or simplify as many manual operations as possible.

In accordance with the present invention, the insertion of the plants through the mulch paper into the soil is achieved automatically by means of one or more, normally two, rotating turret assemblies. Such manual assistance as is required in the operation of the improved device sets no limitation on the rate at which the planting is accomplished.

The invention will be described with the aid of the accompanying drawings in which:

Fig. 3 is a vertical section on an enlarged scale on the line 3—3 in Fig. 2, omitting certain details of the revolving turrets;

Figs. 4 and 5 are transverse sections taken on the lines indicated in Fig. 6, omitting a portion of the housing for clarity;

Fig. 6 is an enlarged detail view of the right-hand end portion of Fig. 3; and

Fig. 7 is an enlarged detail view of the cam controlling the lowering and raising of the planting fingers.

Figure 1:
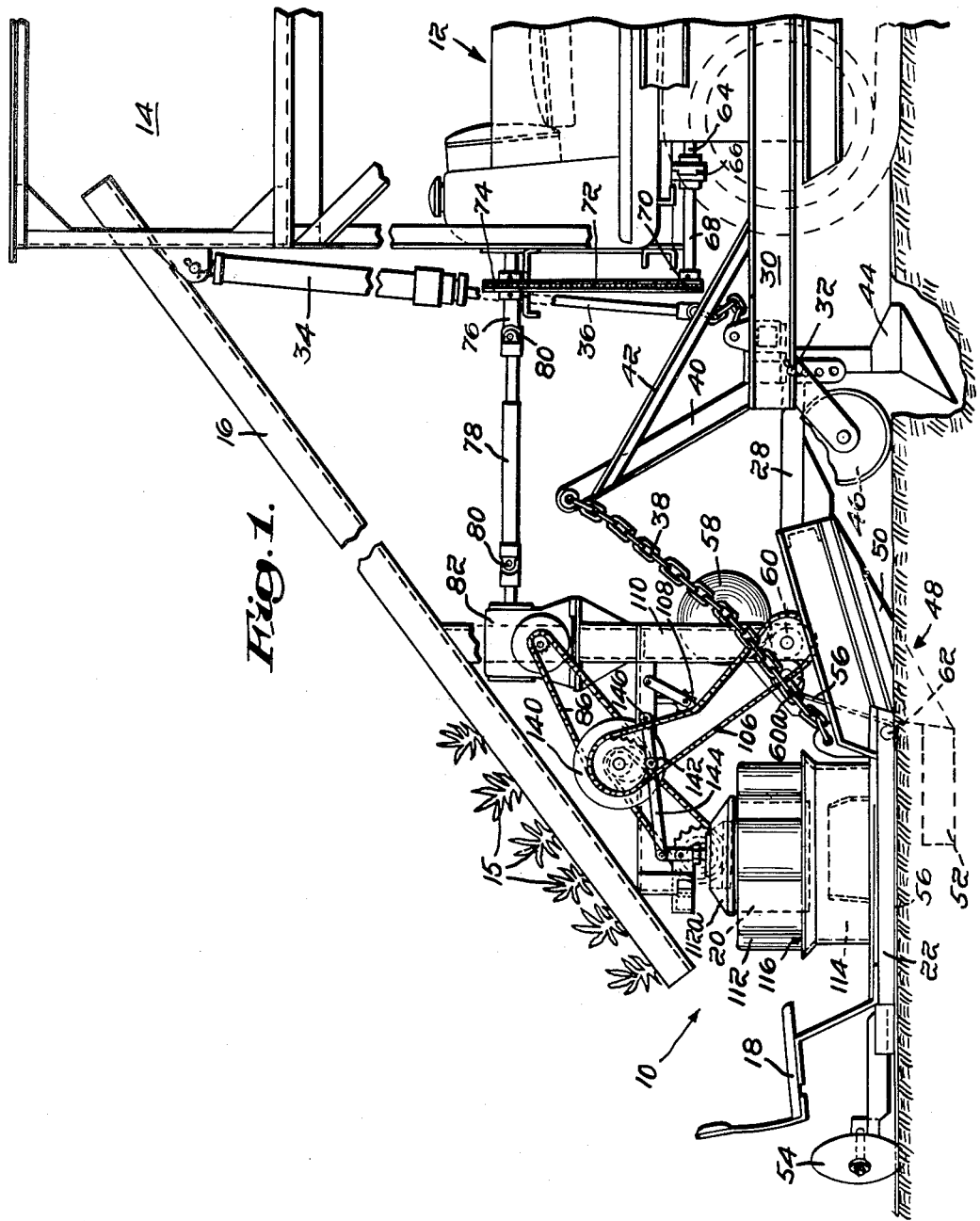
Fig. 1 shows the improved planting aid in side elevation.

As shown in Fig. 1, the planting aid 10 will be noted as linked to a tractor 12, supporting a bin 14, representing the source of supply of the pineapple plants 15. In operation, one or more workers standing in the bin feed the plants to chutes 16 serving to convey the plants to operators seated in the seats 18, these operators being charged with introducing the plants into the turret assemblies 20.

The body of the planting aid 10 is represented as a conventional mulch paper-laying sled 22 having runners 24 (Fig. 3) of a width precluding substantial sinking of the sled into the soil 26, which is to be assumed as having previously been brought to condition by plowing, harrowing, etc.

The sled 22 is connected by a tongue 28 and pin 32 to a hitch frame 30 hingedly mounted on the main frame of tractor 12. A hydraulic mechanism including cylinder 34 and piston stem 36, both shown broken away, serves with the chains 38, connected to the hitch frame 30 via supports 40 and 42, in the raising of the planting aid from the ground, as when it is desired to turn the equipment about. Chutes 16 may be suitably manipulated by the operators so that the same will not interfere during this action.

Depending from the hitch frame 30 are a pair of vertically adjustable plows 44 which, in their alignment, conform with the planting rows. These plows function to break the soil ahead of the planting aid and may serve as points for the injection of a soil fumigant, for example. A gage wheel 46 will be seen positioned rearwardly of the plows 44.

Members 48, fixed to the underside of the sled 22, are described in detail in the previously mentioned Patent No. 2,708,812. Such members are in alignment with the plows 44 and create the voids or openings in the soil in which the plants are received. Each consists of a blade portion 50 and a portion 52 which is triangular in cross section and which progressively increases in cross-sectional area rearwardly of the blade portion. The voids thus formed are fugitive, the environmental soil substantially immediately collapsing upon the continued movement of the equipment. In accordance with the invention, the operation of the automatic planting mechanism is closely controlled so that the plant is delivered to the soil just before the void is closed by the collapsing soil. The subsequent automatic filling of the void serves to firmly anchor the plant at the proper depth for optimum growth.

Members 48 possess the incidental advantage, obtaining when "suckers" are being planted, of causing the deposition of loose soil between the body of the plant and the small leaves at the root end of the plant. This tends to accelerate the necessary disintegration of the leaves and to speed the development of the small root tendrils.

A pair of harrows 54 carried at the end of the sled 22 throw soil over the side edges of the mulch paper 56 which is thereby secured in place over the planting bed. The mulch paper is fed from a roll 58 and passes partly around marking rolls 60, 60a, producing the perforations through which the plants are inserted into the soil. An idler roller 62, about which the mulch paper also passes, is carried by the sled between the runners 24 at approximately ground level. The free end of the mulch paper may be anchored at the starting end of the planting bed in any suitable way.

Turret assemblies 20, as shown in Fig. 6, each includes a side casing 112 carrying five pairs of equi-spaced vertical rods 120 on which vertically slidable arms 122 are mounted, each arm 122 terminating in a gripping finger 124, and each arm carrying cam followers 128 and 160. Each assembly is mounted for rotation on a fixed hollow vertical shaft 132 which is secured to frame 110, the assembly being carried by thrust bearings 110a consisting of an annular ball bearing assembly, the lower race of which is fixedly mounted on a shoulder adjacent the upper end of shaft 132, and the upper race of which is secured to side casing 112. Secured about the upper end of shaft 132 is a fixed cover 112a and secured to the lower end is bottom 138 carrying a fixed annular trough 114 extending around shaft 132 and also carrying a guide 136 disposed within the hollow shaft 132. Shaft 132 also carries a fixed cam track 130 extending part way around the periphery of the shaft between its upper and lower ends. In order to provide for rotation of the turret assemblies 20, it will be seen that with the particular arrangement illustrated, the rotary motion thereof is obtained from the tractor power take-off 64, the transmission system including: a coupling 66; an extension shaft 68 journaled in bearings secured to the main tractor frame; a sprocket 70; a chain 72; a sprocket 74, mounted on a shaft 76 journaled in bearings attached to the main tractor frame; an adjustable shaft section 78, having universal joints 80; an angle gear reducer 82; a counter-shaft 84 (Fig. 2) journaled in bearings on the frame of planting aid 10 and linked to the output shaft of the gear reducer by a chain 86, which passes about sprocket wheels 88 and 90, respectively; a pinion shaft 92, driven from the counter-shaft 84 by means of a chain 94, passing about sprockets 96 and 98, respectively, and having a bevel gear 100 at either end, meshing with ring gears 102 through a slot in cover 112a. Ring gears 102 are secured to the upper part of side casings 112 of the turret assemblies. The turret assemblies are oppositely rotated by this arrangement, the turret assembly appearing in the upper part of Fig. 2 turning clockwise and that appearing in the lower part turning counter-clockwise.

In addition to sprockets 88 and 98, counter-shaft 84 carries at one end thereof a sprocket 104 so that the paper-perforating or marking rolls 60, 60a may be driven through such shaft via chain 106 (Fig. 1). Since the marking rolls and turret assemblies are all driven from a single power source, their speeds are synchronized so that the linear rate of travel of fingers 124 along their circular path as they rotate with the turret assemblies is equal to the linear rate of travel of the advancing tractor and also equal to the rate at which the mulch paper (which is stationary with respect to the ground) is let out rearwardly of the tractor. Accordingly, fingers 124 will be substantially stationary with respect to the ground during that portion of their orbits during which they are moving rearwardly of the tractor.

Figure 2:
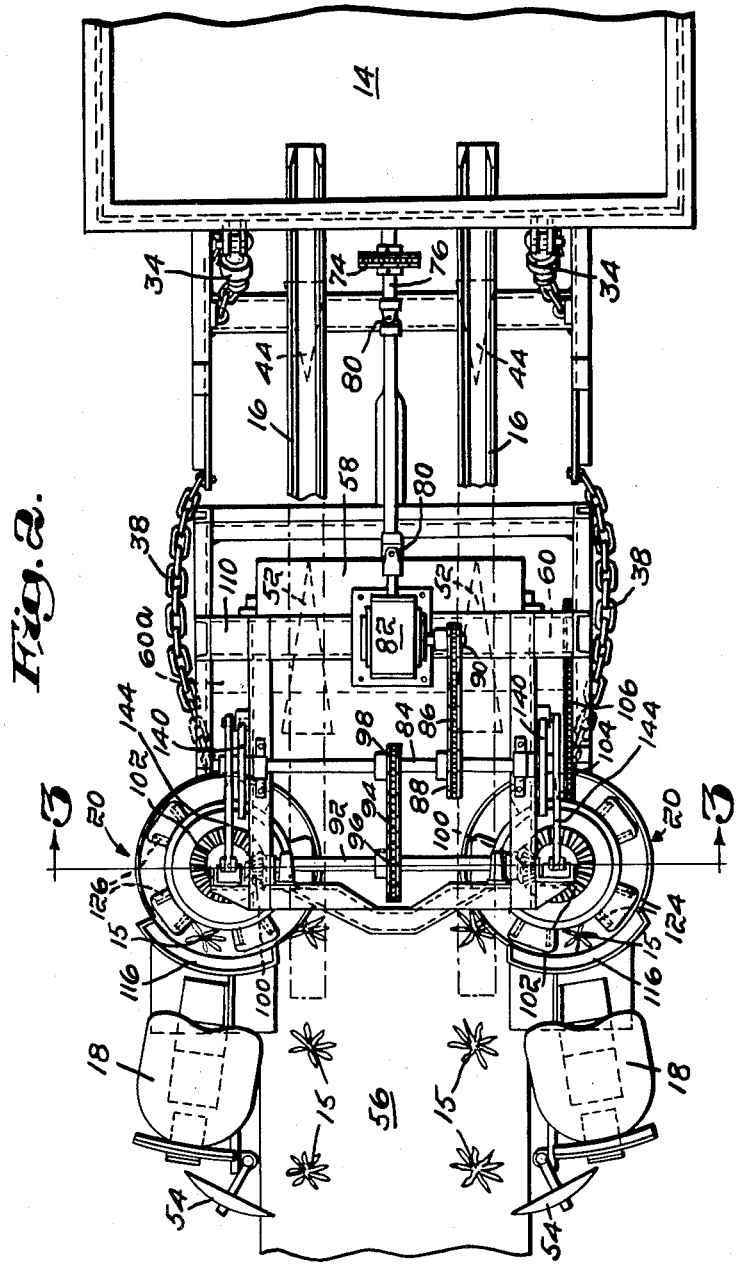
Fig. 2 is a plan of the improved planting aid.

An adjustable sprocket 108 (Fig. 1) secured to the framework 110 enables proper tensioning of the chain 106. This framework supports the angle gear reducer 82, the counter-shaft, the mulch paper roll 58 and the marking rolls. Side casing 112, mounted for rotation with the turret, is formed with five outwardly projecting hollow box-like portions, as best shown in Figs. 2 and 3, the spaces between which portions serve as guides for positioning the plants properly at the time of their introduction into the turret asembly. The annular stationary trough 114 about the bottom portion of the assembly immediately beneath rotating side casing 112 is provided with a feed opening 116 (Fig. 1) through which the operator introduces the plants through the space between the projecting portions of side casing 112 as they advance over it. This trough is broken at 118 (Figs. 4 and 5) to allow for the planting action immediately beneath that portion of the orbit of fingers 124 in which they are substantially stationary with respect to the ground and with respect to mulch paper 56.

Within the turret assembly and mounted for rotary movement are five pairs of equi-spaced vertical slide rods 120, each pair of which carries a pair of arms 122 vertically slidable on the rods and terminating in fingers 124 faced with elastic pads 126. Each pair of fingers 124, when in the fully open position, lies immediately beneath the opposing vertical faces of adjacent projecting portions of side casing 112, as shown in Fig. 2. In operation, a plant on being inserted between a finger pair is carried around the turret about 240° (clockwise or counter-clockwise, depending on the particular turret), sliding on the bottom of trough 114, from a position corresponding to the opening 116 in the turret casing, that position being immediately forward of the seat 18, to the planting position under the pinion shaft 92, where it is positively inserted through a perforation in the mulch paper into the void created by the member 48. As shown in Figs. 4 and 5, wherein the point of introduction of the plant by the operator is indicated at 125, the fingers 124 begin to close about the plant at about the "5 o'clock" position, becoming fully closed at approximately "2 o'clock."

To attain the action just described, each finger-bearing arm 122 is mounted on a sleeve consisting of a hub 150 geared at its upper end and bracket member 166, both slidable as a unit vertically on slide rod 120, but hub 150 together with arm 122 being rotatable around rod 120 independently of bracket member 166. A rigid bar 167 extends between the two adjacent bracket members mounted on each pair of slide rods to hold each bracket member against rotation about its respective slide rod. Secured to bracket member 166 is cam follower 128 which serves to control the vertical movement of the unit, follower 128 riding in arcuate track 130 secured to the outer face of hollow shaft 132 and extending around a portion only of its periphery. A segmental track 130a (Figs. 4 and 6) in horizontal alignment with the opposite ends of track 130 is fixed above the planting position to a reciprocating support rod 134 axially disposed within the turret assembly and reciprocable within a guide 136 fastened to the bottom 138 of the shaft 132. As the followers 128 of each pair of finger-bearing arms enter this segment in their travel around the turret, the arms are momentarily lowered by the timed movement of the support rod 134, which is shown in planting position in Fig. 6.

The timed movement of the support rod 134 is achieved by a system including a grooved cam 140 (Figs. 3 and 7) carried on the counter-shaft 84. The groove of cam 140 is a developed track as shown in Fig. 7. Riding in the groove of this cam is a follower 142 (Fig. 1) mounted on a follower arm 144, pivoted at 146 to the frame 110, and hingedly connected at its opposite end to a linkage 148, which in turn is hingedly connected to the upper end of the support rod. On upward movement of the support rod 134, the track segment 130a is restored to its normal position in horizontal alignment with the body of the track 130. During all of the indicated action the finger-bearing arms continue to revolve within the turret.

The parts provided for effecting the necessary opening and closing of the fingers 124 are best seen in Figs. 4, 5 and 6. It will be observed that each of the finger-bearing arms 122 is pivotally mounted on its slide rod 120 through a geared hub 150 and that the paired hubs intermesh; further, that the leading rod 120 of each pair of such rods carries, in addition to the geared hub 150 and bracket member 166, an auxiliary hub 152 positioned below the bracket member and rotatable independently of both hub 150 and bracket member 166. Fixedly secured to the auxiliary hub is a pair of arms 154 and 156, the latter arm being linked to the trailing finger-bearing arm 124 via a spring 158. A cam follower 160 associated with the arm 154 makes contact with an arcuate cam 162 (Fig. 5) which is fixed to arcuate track 130 and a segment 162a fixed to segment 130a. As cam follower 160 makes contact with cam 162 during rotation of the turret assembly, its movement when it rides up over the edge of cam 162 causes counter-clockwise rotation of the hub 152, the trailing finger arm 122, by reason of the spring 158, being consequently drawn toward the leading finger-bearing arm. In view of the gearing together of the hubs 150, each of which rotates with its corresponding finger arm 122, the latter action is accompanied by movement of the leading finger-bearing arm toward the trailing finger-bearing arm, resulting in closing of the fingers about the plant.

When the follower 160 loses contact with the cam segment 162a at about "12 o'clock" (Fig. 5), this being the planting position, the finger-bearing arms are sprung open, and are maintained open until the follower again contacts the cam 162, by a coil spring 164 encircling bracket member 166 and having one end anchored thereto with the other end anchored to the leading finger-bearing arm 122, the tension in the spring yieldingly urging the leading arm away from the trailing arm.

In operation, as the tractor advances over the ground, mulch paper 56 is payed out rearwardly of the tractor, the paper remaining stationary with respect to the ground. Simultaneously, the paper is perforated at the desired spaced intervals by marking rolls 60, 60a, the speed of which is synchronized with that of the tractor. The plants are fed manually into chutes 16 whence they are taken and introduced manually into the open spaces between the projections of rotating side casings 112 of each turret assembly 20 (see Figs. 4 and 5), the plants resting upon the bottom of annular trough 114 and projecting upwardly between a pair of spaced opposing finger pads 126 where said pads are open to receive them. Continued rotation of each turret assembly about its fixed shaft 132 causes cam follower 160 to be urged radially outwardly as it strikes arcuate cam 162, thus rotating auxiliary hub 152 together with its lever arm 156 counter-clockwise as seen in Fig. 4 to draw the trailing finger arm 122 of each pair forwardly toward its mate. Hub 150 of the trailing finger arm rotates upon its slide rod as the finger arm is advanced. Both hubs 150, 150 of the leading and trailing finger arms are provided with gears at their upper ends (Fig. 6) which intermesh, thus causing hub 150 of the leading finger arm to rotate in the opposite direction from the hub 150 of the trailing arm, carrying the leading finger arm with it rearwardly toward the trailing finger arm. Plant 15 is thus gripped yieldingly between opposing finger arm pads 126 as it is advanced around trough 114. During this operation each pair of finger arms is maintained at constant level by cam followers 128 which ride in cam track 130 secured to shaft 132 and support bracket members 166 together with hubs 150, 150 on slide rods 120, 120.

As cam follower 128 reaches the end of cam track 130 in its rotation about shaft 132, it enters segmental track 130a which has been raised to a position in horizontal alignment with the end of track 130 by elevation of reciprocating support rod 134, which is raised by means of follower arm 144 and cam follower 142 riding in the groove of cam 140. Rod 134 is thereupon moved downwardly by cam 140 and follower 142, carrying with it segmental track 130a along with follower 128, bracket member 166, and associated finger arms 122 still gripping between them plant 15 by reason of follower 160 riding on supplemental cam track 162a, the plant at this point having passed beyond the end of the bottom of trough 114 and being held substantially stationary with respect to the ground over which it is passing by reason of the synchronization of the speed of rotation of the turrets with the speed of the tractor. As the bottom of plant 15 reaches ground level, it is in registration with one of the perforations in the mulch paper and is immediately to the rear of expansion member 52 which is advancing beneath the ground. Passage of the expansion member 52 causes formation of a subterranean void, the walls of which immediately collapse around the roots of plant 15 as it is further lowered. At this point follower 160 leaves the end of cam 162a, whereupon coil spring 164 urges leading finger arm 122 forwardly. Intermeshing of hubs 150, 150 simultaneously causes trailing finger arm 122 to swing rearwardly, thus releasing plant 15.

Continued rotation of cam 140 causes support rod 134 to be raised, carrying with it segmental track 130a together with follower 128 and the associated finger arms 122. As track 130a reaches the level of fixed track 130, follower 128 passes on to track 130, and the pair of finger arms are ready to start a new cycle.

Various modifications in the equipment shown may be made, of course, without departing from the spirit and scope of the invention.

I claim:

1. A plant-setting machine or the like adapted to be advanced across the ground during operation comprising a turret assembly mounted for rotation about a vertical axis through a receiving station and a planting station, a plurality of radially extending pairs of opposing finger members mounted on said turret for rotation therewith, means for rotating said turret to advance said fingers through said stations, means at said receiving station for slidably supporting a plant between a pair of opposing finger members as they advance, means for closing said finger members to grip said plant between them as they advance through said receiving station, means for lowering said finger members gripping said plant at said planting station and for raising said finger members before they return to said receiving station, and means for opening said finger members in their lowered position at said planting station to deposit the plant.

2. A machine as defined in claim 1 in which said means for rotating said turret is synchronized with the speed of advance of the machine, the peripheral speed of rotation of the finger members being substantially equal to said speed of advance.

3. A plant-setting machine or the like adapted to be advanced across the ground during operation, comprising a turret assembly mounted for rotation about a vertical axis, said turret assembly including at least one pair of opposing finger members adapted to receive a plant between them at a receiving station as they rotate with said assembly about a circular path, a trough member underlying the circular path at said receiving station adapted to slidably support a plant as its advances therealong between said finger members, means for closing said finger members to grip said plant between them as they advance over said trough member, means for lowering said finger members gripping said plant at a planting station after they pass the end of said trough member and for raising said finger members before they return to the receiving station, means for opening said finger members at the planting station in their lowered position to deposit the plant, and means for rotating the turret assembly about its axis at a speed synchronized with the speed of advance of the machine, the peripheral speed of rotation of the finger members being substantially equal to said speed of advance.

4. A plant-setting machine or the like comprising a frame a turret assembly mounted on said frame for rotation about a vertical axis for gripping and advancing a plant from a receiving station to a planting station, a pair of spaced generally vertical slide rods mounted on said turret assembly for rotation about said axis, a radially outwardly extending finger member slidably and rotatably mounted on each slide rod, cam means yieldingly connected to said finger members for yieldingly rotating said finger members on their slide rods toward each other as they are advanced through said receiving station by rotation of said turret assembly, an arcuate cam track fixed to said frame concentric with the axis of said turret assembly, a segmental cam track mating with the ends of said fixed track at said planting station and mounted for vertical reciprocation on said frame, a cam follower secured to both said finger members riding in said cam tracks, means for rotating said turret assembly, means for reciprocating said segmental cam track in timed relation to the rotation of the turret assembly to slidably lower and raise said finger members on their slide rods as they advance through said planting station, and means for rotating said finger members away from each other on their slide rods in lowered position.

References Cited in the file of this patent

UNITED STATES PATENTS

| | | |
|---|---|---|
| 107,162 | Chamberlin | Sept. 6, 1870 |
| 653,298 | King | July 10, 1900 |
| 1,562,353 | McGuire et al. | Nov. 17, 1925 |
| 2,408,599 | Bennett | Oct. 1, 1946 |
| 2,609,943 | Winder | Sept. 9, 1952 |
| 2,708,812 | Nakai | May 24, 1955 |